United States Patent [19]
Mulligan

[11] 3,951,543
[45] Apr. 20, 1976

[54] MANUALLY OPERATED READER-PRINTER

[76] Inventor: David D. Mulligan, 3143 Vichy Ave., Napa, Calif. 94358

[22] Filed: May 6, 1974

[21] Appl. No.: 467,419

[52] U.S. Cl. ................................. 355/27; 355/5; 355/44; 353/27 R; 353/74
[51] Int. Cl.² ........................................ G03B 7/14
[58] Field of Search ............ 355/13, 44, 73; 353/27, 353/74

[56] References Cited
UNITED STATES PATENTS

| | | | |
|---|---|---|---|
| 920,516 | 5/1909 | Adlon | 355/44 |
| 2,202,353 | 5/1940 | Morgan | 355/44 |
| 3,600,083 | 8/1971 | Leedom | 355/13 |
| 3,722,999 | 3/1973 | Cunha | 355/72 |

*Primary Examiner*—John F. Gonzales
*Attorney, Agent, or Firm*—Townsend and Townsend

[57] ABSTRACT

A system for providing a standard microfiche or similar reader with the capacity for making prints of the projected material without substantially modifying the reader is disclosed. A screen extension is provided having one end mountable to the face of the reader. The viewing screen of the reader is removed from its normal position and placed at the opposite end of the screen extension. The extension has a substantially light-impervious walled periphery which has an elongate narrow slot in one wall. A paper carrier is insertable through the slot in the periphery of the screen extension to a position adjacent the interior surface of the viewing screen. One side of the paper carrier is removable to expose light-sensitive paper in the carrier to the image projected by the reader. The system of the present invention also includes apparatus for supplying light-sensitive paper to the paper carrier and apparatus for developing the exposed light-sensitive paper.

7 Claims, 7 Drawing Figures

U.S. Patent     April 20, 1976     Sheet 1 of 2     3,951,543
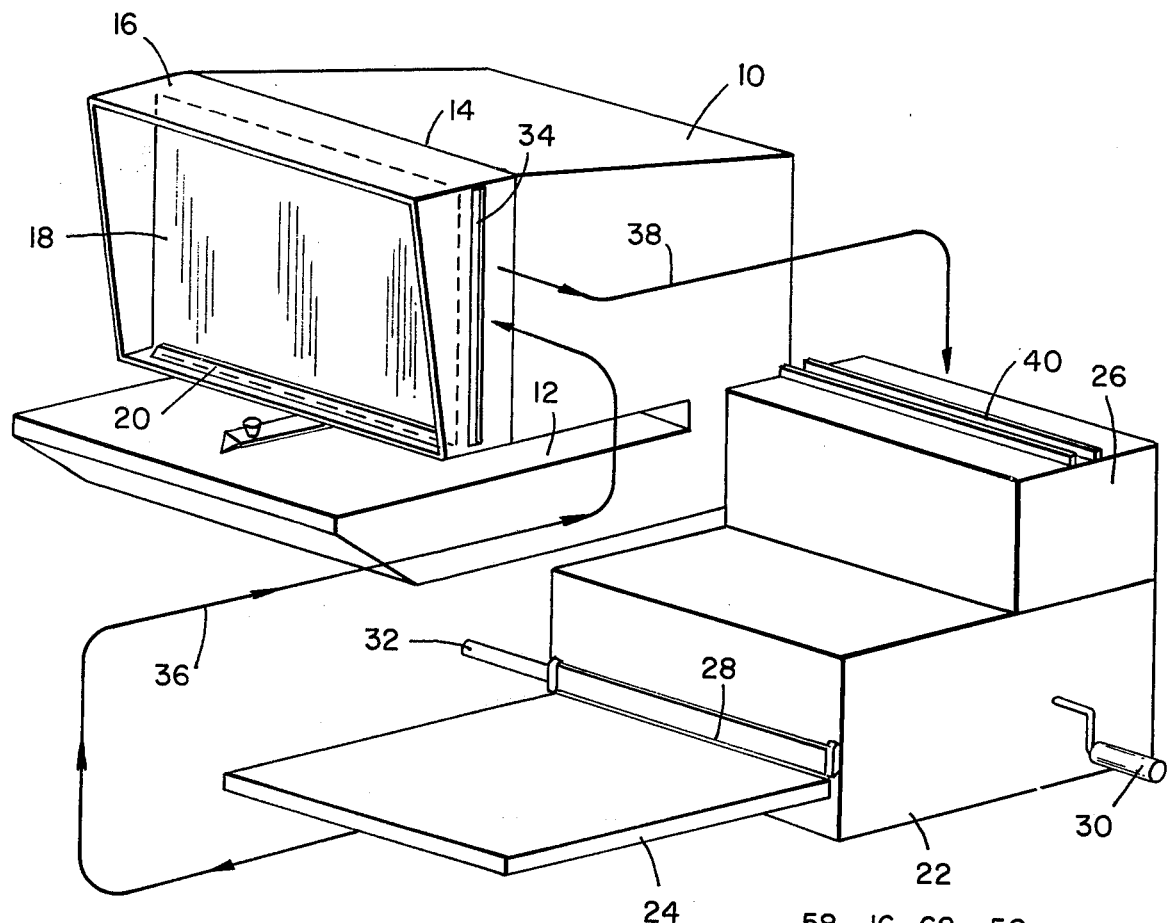
FIG_1
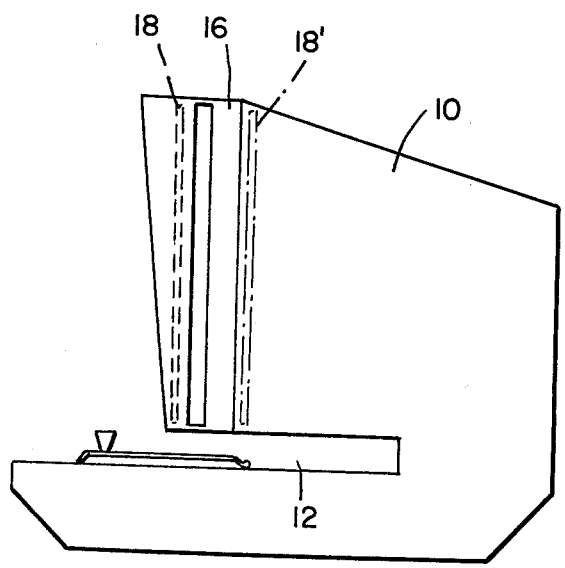
FIG_2
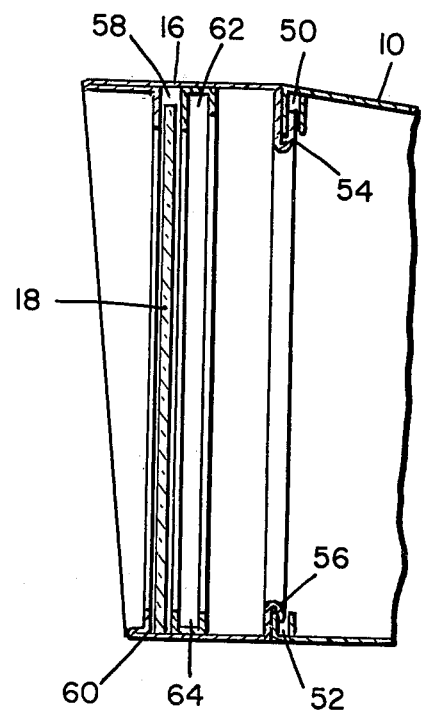
FIG_3

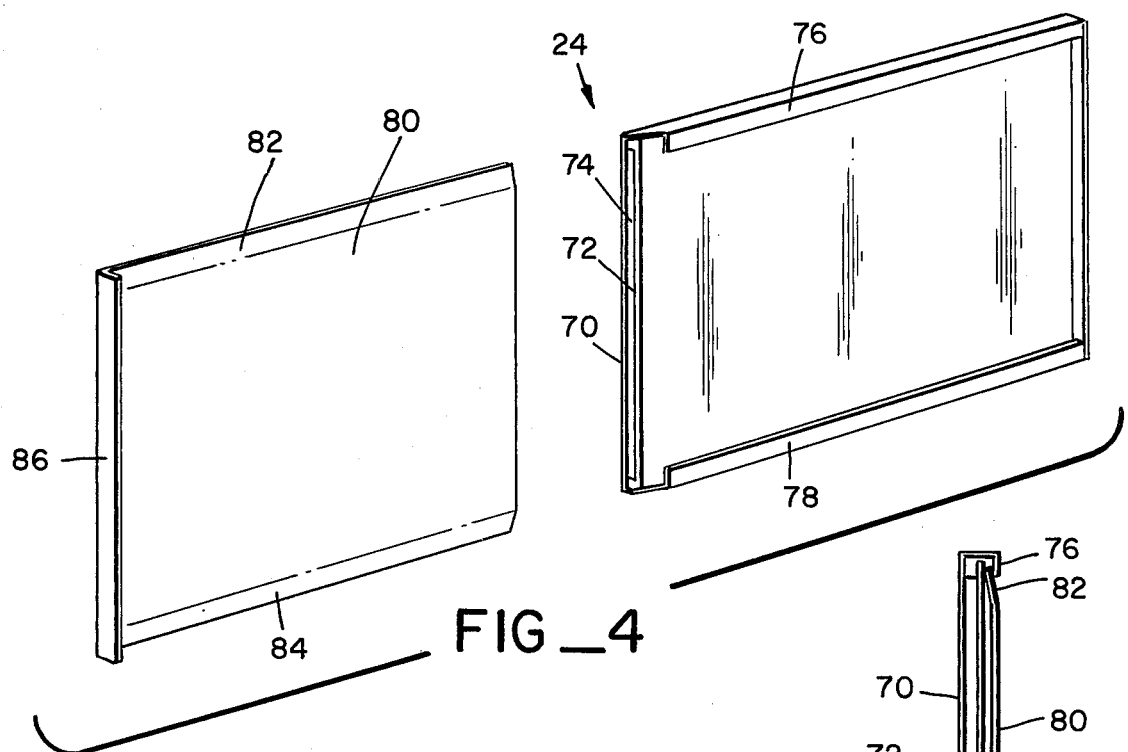
FIG_4
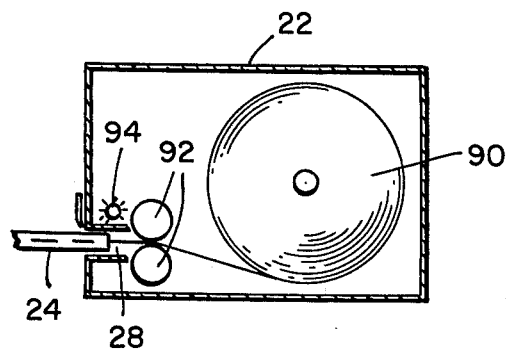
FIG_6
FIG_5
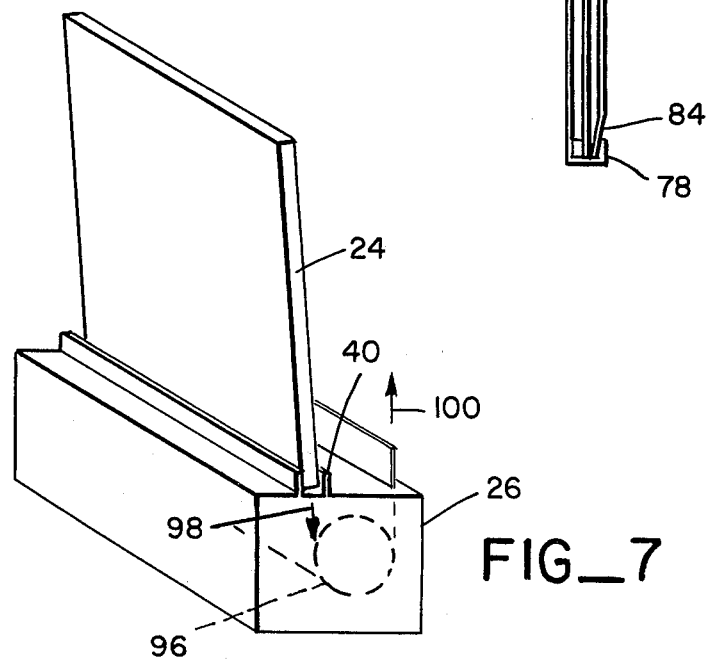
FIG_7

MANUALLY OPERATED READER-PRINTER

BACKGROUND OF THE INVENTION

The present invention relates to a system for providing a standard microfiche or similar reader with the capacity for making prints of the projected image without substantially modifying the reader.

The use of microfiche, microfilm and similar mechanisms to store large volumes of printed material has become quite commonplace. When access is required to the information stored thereby, the fiche or film is inserted into a reader which projects the material onto a viewing screen so that it can be easily read. In order that such material can be retained in a more permanent format when desired, many such readers also include a mechanism by which photocopies or prints of the projected material can be made. With such modified reader-printers, the stored information can be reviewed by the user, and only those portions desired need be printed, thus rendering the total system highly efficient for the user.

The primary difficulty with microfiche and the like readers which incorporate an option for making prints of the projected material is their cost and complexity. The printing mechanism must necessarily be interposed between the optics of the system and the viewing screen in order to make prints. Such reader-printers customarily employ one or more mirrors inside the reader which move into position between the screen and the optics when the print option is selected. These readerprinters often require up to four servomotors, a plurality of microswitches to control the operation of the servomotors, and cost in the neighborhood of $1,000. Furthermore, due to the complexity of such devices, their reliability is relatively poor and they must be periodically maintained, and the maintenance fees for such systems can be as high as $200 per year and more.

SUMMARY OF THE INVENTION

The present invention provides a system for manually making prints of material projected by a standard microfiche or like reader without substantially modifying the reader itself. The viewing screen of the reader is removed from its normal position in the reader. A screen extension is provided having one end mountable to the face of the reader and a screen guide at the opposite end into which the removed viewing screen of the reader is placed. The screen extension has a substantially light-impervious outer periphery having an elongate narrow slot in one wall thereof. A paper carrier is insertable through the slot in the periphery of the screen extension to a position adjacent the interior surface of the viewing screen. The paper carrier includes a mechanism for manually exposing lightsensitive paper in the carrier to the image projected by the reader while the carrier is interior of the screen extension.

The system of the present invention is basically manually operated. The user first places a sheet of lightsensitive paper in the carrier, and then inserts the carrier into the screen extension. The paper is exposed by manually removing and replacing an exposure card which forms part of the carrier. The user then removes the carrier containing the exposed paper from the screen extension and transfers the paper to a developer.

The primary advantage of the present invention is that it can easily and inexpensively be added to a standard microfiche or like reader which does not originally contain a printing feature. The cost of such a system is much less than the cost of a reader-printer which has a built-in printing option. Furthermore, the system of the present invention is extremely simple and substantially foolproof, thereby virtually eliminating the need for periodic maintenance.

The principal object of the present invention is to provide a system for incorporationg the capacity for making prints into an existing microfiche reader. However, as an alternate embodiment of the present invention, the reader can be initially constructed according to the teachings of the present invention by providing a slot in the side wall thereof immediately interior of the viewing screen, and guides for the insertion of the paper carrier. The apparatus is still primarily manually operated to achieve the advantages of the present invention as set forth hereinabove.

The novel features which are believed to be characteristic of the invention, both as to organization and method of operation, together with further objects and advantages thereof will be better understood from the following description considered in connection with the accompanying drawings in which preferred embodiments of the invention are illustrated by way of example. It is to be expressly understood, however, that the drawings are for the purpose of illustration and description only and are not intended as a definition of the limits of the invention.

BRIEF DESCRIPTION OF THE DRAWINGS

FIG. 1 is a perspective view of the system of the present invention;

FIG. 2 is a side elevational view of a standard reader employing the screen extension of the present invention;

FIG. 3 is a fragmentary cross sectional elevation view of the attachment of the screen extension to a standard reader;

FIG. 4 is a perspective view of the paper carrier of the present invention with the exposure card removed;

FIG. 5 is a side elevation cross sectional view of the paper carrier of FIG. 4;

FIG. 6 is a side elevation cross sectional view of the light safe of the present invention adapted for use with electrostatic printing paper; and, FIG. 7 illustrates the paper carrier of the present invention being used to insert an exposed paper in the developer.

DESCRIPTION OF THE PREFERRED EMBODIMENT

The apparatus and operation of the system of the present invention is illustrated by way of reference to FIG. 1. A standard microfiche reader 10 is employed which is not originally provided with a printing option, and therefore costs far less than reader-printers which have such an option. Customarily, a microfiche is placed in slot 12 of reader 10, and a portion of the data thereon is projected onto a viewing screen at the face 14 of the reader. However, in the system of the present invention, the viewing screen of reader 10 is removed from its normal location and a screen extension 16 is mounted to the reader in place of the viewing screen. The removed viewing screen 18 is placed in a screen guide 20 at the exposed end of screen extension 16.

Screen extension 16 has a generally light-impervious outer periphery so that screen extension 16 does not interfere with the normal operation of the reader, and the optics of the reader will project an image of the microfiche on viewing screen 18 as previously. Thus, when the printing option is not desired, reader 10 can be used as a standard microfiche reader even when the apparatus of the present invention is in place.

In addition to screen extension 16, the system of the present invention includes a light safe 22, paper carrier 24 and developer 26. Light safe 22 is adapted to contain a quantity of light-sensitive paper and prevent premature exposure of the paper. When a sheet of unexposed paper is desired for printing, paper carrier 24 is inserted into a slot 28 at the front of light safe 22, and handle 30 is turned so that the light-sensitive paper will be fed into paper carrier 24. When the appropriate length of paper has been inserted in paper carrier 24, the paper is cut by manually actuating blade 32.

After paper carrier 24 has been provided with a sheet of light-sensitive paper, the paper carrier is removed from light safe 22 and inserted in a slot 34 provided in one wall of screen extension 16 as illustrated by arrows 36. Slot 34 is located so that paper carrier 24 is adjacent the interior face of viewing screen 18 when placed in screen extension 16. One planar face (called the exposure card) of carrier 24 is removable when the paper carrier is in place in screen extension 16, as will be illustrated hereinafter, so that the light-sensitive paper in the carrier is exposed to the image projected by the optics of reader 10. After exposure of the paper for a preselected time interval, the exposure card is replaced to prevent further exposure of the paper. The exact exposure time of the paper used is not critical and mechanical removal and reinsertion of the exposure card still yields high quality prints.

After the light-sensitive paper in carrier 24 has been exposed and the exposure card replaced, the carrier is removed from screen extension 16 as indicated by arrows 38 and inserted in slot 40 at the top of developer 26. The paper is then engaged by rollers interior to developer 26 without unwanted exposing of the light-sensitive paper. Developer 26 develops the image which had been produced on the paper when it is exposed in screen extension 16 so that a print is made of the matter being projected by reader 10.

The manner in which screen extension 16 is joined to reader 10 in the preferred embodiment of the present invention is illustrated by way of reference to FIGS. 2 and 3. Viewing screen 18 of reader 10 is ordinarily mounted in opposing slots 50, 52 at the leading end of reader 10 as illustrated by 18' in FIG. 2. The depth of upper slot 50 is substantially greater than that of lower slot 52 so that the viewing screen can easily be inserted or removed by first moving the screen upwardly in slot 50 and then either engaging or disengaging the screen from lower slot 52. In the preferred embodiment of screen extension 16, it is provided with flanges 54, 56 which can be inserted in respective slots 50, 52 in place of the viewing screen and attaches to reader 10 in the same manner as the viewing screen. Thus, attachment of screen extension 16 to reader 18 involves no substantial modification of the reader.

A screen guide is provided at the opposite end of viewing screen 16 from the end that attaches to the reader, and comprises opposing upper and lower slots 58, 60 respectively. As in reader 10 itself, the depth of upper slot 58 is substantially greater than that of lower slot 60 so that the viewing screen can easily be removed and reinserted. Immediately adjacent the interior surface of viewing screen 18, slots 62, 64 define a guide for the paper carrier (not shown).

Not all available microfiche and like readers have a viewing screen which is easily removable as illustrated in FIG. 3. In some such readers, a plurality of screws, clamps, or like mechanisms are used to hold viewing screen in place and must be opened or removed to detach the viewing screen. With such readers, the embodiment of the screen extension illustrated in FIGS. 2 and 3 is modified to attach it to the face of the reader, preferably utilizing the screws or clamps which originally held the viewing screen in place. It is apparent that other design modifications of screen extension 16 may be necessary to accommodate different designs and styles of readers. Such modifications are within the scope of the present invention.

It is readily apparent that the features of screen extension 16 can be incorporated as part of reader 10 proper as part of the reader construction. Rather than adding such a screen extension to the face 14 of reader 10, reader 10 could be initially constructed with slot 34 in the side wall of the reader. If desired, a flap could be placed overlying slot 34 when not in use to enhance the quality of the projection on viewing screen 18. The other elements of the system of the present invention would remain the same.

Paper carrier 24 is more fully illustrated by way of reference to FIGS. 4 and 5 in combination. Carrier 24 has a first planar face 70 which is substantially light-impervious, and a glass plate 72 spaced parallel to face 70 and fixed thereto. Planar face 70 and glass plate 72 define a slot 74 into which the light-sensitive paper is placed. Flanges 76, 78 extend from planar face 70 and terminate parallel to glass plate 72. An exposure card 80 is adapted to normally overlie glass plate 72, and is held in place by flanges 76, 78. The lateral edges 82, 84 of card 80 are inwardly canted as shown so that insertion and removal of the card will not abrade glass plate 72. When paper carrier 24 is inserted into the interior of the screen extension as illustrated previously, exposure card 80 can be removed by pulling flange 86 thereon so that the light-sensitive paper in slot 74 will be exposed through glass plate 72. After exposure of the paper for the preselected time interval, exposure card 80 is replaced to prevent further exposure of the light-sensitive paper.

A roll 90 of light-sensitive paper is carried interior of the light safe 22 so that it is not prematurely exposed, as illustrated in FIG. 6. Paper from roll 90 is dispensed through rollers 92 directly into paper carrier 24 which fits into slot 28 at the front of light safe 22. If electrostatic printing methods are to be used with the system of the present invention, paper having a photoconductive coating is used and a surface charge is placed on the paper as it is being dispensed by the corona bar 94. It has been found that the surface charge is not substantially impaired by manual handling of paper carrier 24 in the system of the present invention so that electrostatic printing as well as other methods of printing may be used with the apparatus disclosed herein.

After exposure of the light-sensitive paper, paper carrier 24 is inserted in slot 40 in developer 26 as illustrated in FIG. 7. The exposed paper is engaged by rollers such as 96 which draw the exposed paper out of carrier 24 as illustrated by arrow 98 so that the paper is not further exposed. Developer 26 can be a heat developer if heat sensitive paper is used, an electrostatic developer if such paper is used, or any other type of developer which is suitable to the type of light-sensitive paper which is being used in the system. The developed paper is ejected from the developer 26 as illustrated by arrow 100 and contains a print of the material projected by the reader.

As is apparent from the above discussion, the apparatus of the present invention relies heavily on manual procedures rather than mechanized apparatus. The advantage of such a system is that it can be employed at relatively low cost so that it is available to institutions which do not have the budget or the usage to justify a much more expensive reader-printer. With the system of the present invention, a plurality of readers can be fitted with screen extensions 16, but only one light safe 22, paper carrier 24 and developer 26 need by employed, further reducing the expense of the system of the present invention. Hence, the present invention provides a practical printing system which can easily be afforded by virtually any institution which uses microfiche or microfilm storage.

While preferred embodiments of the present invention have been illustrated in detail, it is apparent that modifications and adaptations of those embodiments will occur to those skilled in the art. However, it is to be expressly understood that such modifications and adaptations are within the spirit and scope of the present invention, as set forth in the following claims.

What I claim as new is:

1. A system for providing a standard microfiche or like reader with the capacity for making prints of the projected material without substantially modifying the reader other than removal of the viewing screen therefrom, said system comprising:
   a microfiche reader having a forward generally vertically disposed face ordinarily including a viewing screen and adapted to normally project a microfiche image onto said viewing screen, the screen of said reader being removed;
   a screen extension having one end mountable to the forward face of the reader at the location of the removed screen, said extension including a substantially light-impervious walled periphery having an elongate narrow slot in one wall thereof and means mounting the removed screen at the opposite end of said extension for continued use of the reader as a visual display device;
   a paper carrier insertable through the slot in the periphery of the screen extension to the interior of said screen extension adjacent an interior surface of the viewing screen mounted to said extension, said paper carrier including means for exposing light-sensitive paper in said paper carrier to an image normally projected by the reader onto said viewing screen;
   a paper supply module remote from said reader and including means for supplying light-sensitive paper to said paper carrier without exposing said paper; and
   a development module remote from said reader and including means for developing the exposed light-sensitive paper.

2. A system as recited in claim 1 wherein the screen extension additionally comprises a screen guide at the other opposite end of the screen extension, the removed viewing screen of the reader adapted to be placed in said screen guide.

3. A system as recited in claim 1 wherein said screen extension includes means for mounting said one end of the screen extension to the face of the reader in the place of the removed viewing screen.

4. A system as recited in claim 1 wherein said means for exposing light-sensitive paper comprises an exposure card adapted to normally overlie the paper in said paper carrier, said exposure card being manually removable when the paper carrier is inserted through the slot in the periphery of the screen extension to expose the paper.

5. A system as recited in claim 1 wherein the supply means comprises means for supplying light-sensitive paper having a photoconductive coating to said paper carrier, said supply means additionally including means for forming an electrostatic surface charge on the surface of said paper, said surface charge being selectively discharged by exposing said light-sensitive paper in said paper carrier to the image projected to form a latent image; and wherein said developing means comprises means for developing the latent image on the exposed light-sensitive paper.

6. Apparatus for making printed copies of material projected by a standard microfiche or like reader having the viewing screen removed, said apparatus comprising:
   a microfiche reader having a forward generally vertically disposed face ordinarily including a viewing screen and adapted to normally project a microfiche image onto said screen, the screen of said reader being removed;
   a screen extension having a substantially rectangular cross section, one end of said screen extension adapted to mount to the forward face of the reader, the other opposite end of said screen extension having a screen guide, the removed viewing screen of the reader being placed in said screen guide to allow for continued use of the reader as a visual display device, said extension having a substantially light-impervious walled periphery having an elongate narrow slot in one wall thereof;
   a substantially rectangular paper carrier insertable through the slot in the periphery of the screen extension to the interior of said screen extension adjacent the interior surface of the viewing screen, said paper carrier having opposed lightimpervious planar faces adapted to contain a sheet of lightsensitive paper therebetween, one of the planar faces being manually removable when the paper carrier is interior of said screen extension to expose the light-sensitive paper to the image projected by the reader;
   a paper supply module remote from said reader and including means for supplying light-sensitive paper to said paper carrier; and
   a development module remote from said reader and including means for developing the exposed light-sensitive paper.

7. A system as recited in claim 6 wherein said screen extension includes means for mounting said one end of the screen extension to the face of the reader in the place of the removed viewing screen.

* * * * *